June 22, 1965  J. M. SPINKS  3,190,980
ELECTRIC CONTROL FOR USE ON A SCALE INDICATOR
Filed Aug. 5, 1960  3 Sheets-Sheet 1

INVENTOR.
Joseph M. Spinks
BY

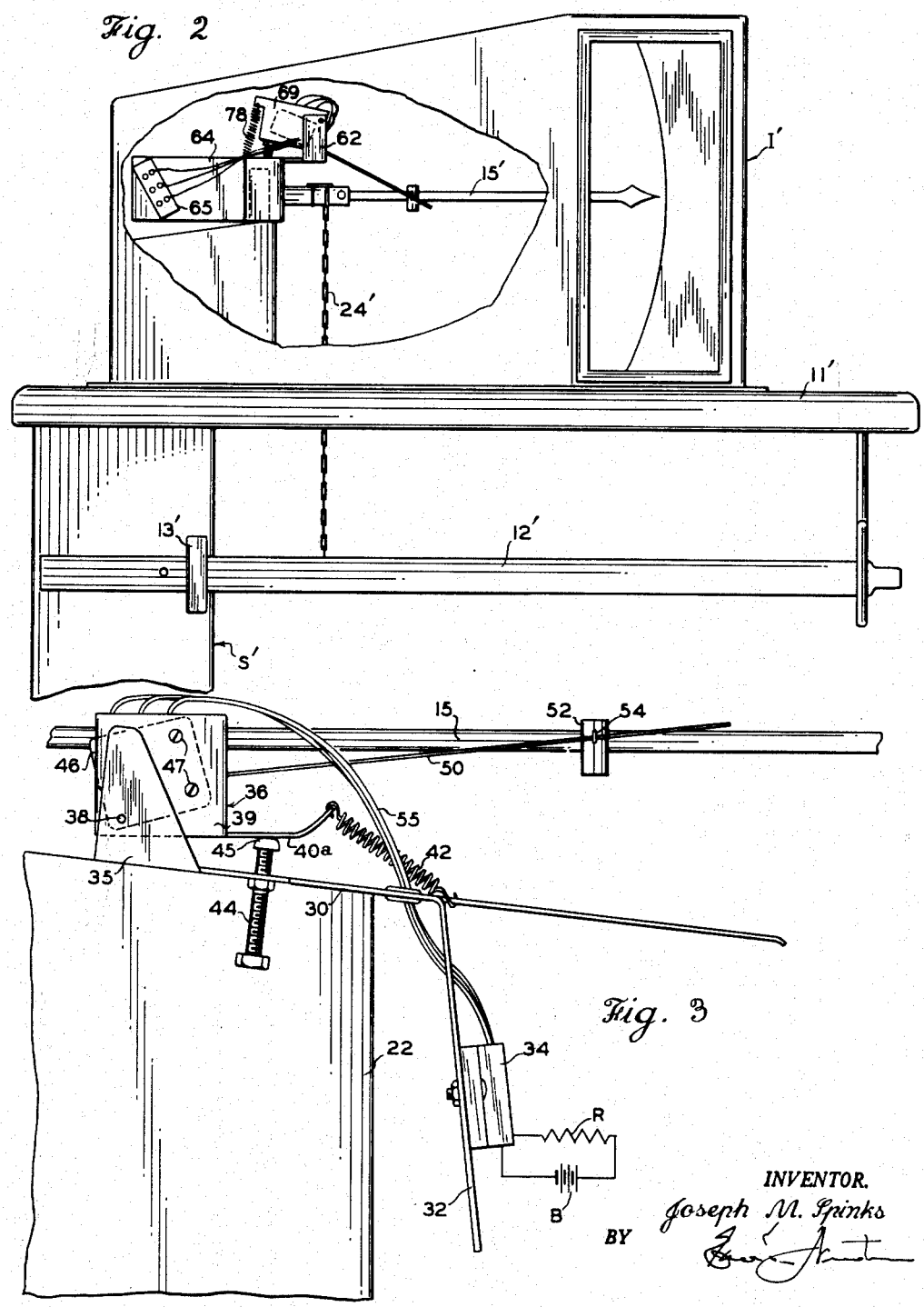

June 22, 1965  J. M. SPINKS  3,190,980
ELECTRIC CONTROL FOR USE ON A SCALE INDICATOR
Filed Aug. 5, 1960  3 Sheets-Sheet 3

INVENTOR.
Joseph M. Spinks
BY

United States Patent Office 3,190,980
Patented June 22, 1965

3,190,980
ELECTRIC CONTROL FOR USE ON A SCALE INDICATOR
Joseph M. Spinks, 584 Manford Road SW., Atlanta, Ga.
Filed Aug. 5, 1960, Ser. No. 47,826
5 Claims. (Cl. 200—56)

This invention relates to automatic weighing devices, and is more particularly concerned with an electric control for use on a scale indicator.

In the past, a number of attempts have been made to have a scale control an electrically operated feed mechanism. One such control uses a magnetic mercury switch. The difficulty with such an arrangement is that the magnet pulls the pointer to zero before the proper weight has been reached. Also, the magnet will hold the pointer at zero even though the desired weight has been exceeded. On heavy duty scales, this variation may be up to twenty pounds.

Others have attempted to control mechanisms by putting a mercury switch on the scale beam such that, when proper weight is reached, the mercury switch is actuated to actuate a circuit. In this arrangement, the lead wires to the mercury switch have a certain degree of stiffness which exerts forces on the scale beam and gives inaccurate weighings.

The present invention overcomes the difficulties encountered in the past by attaching switches to an indicator rather than directly to the scale beam, and by using mechanical switches such as "micro switches" rather than magnetic or mercury switches. The indicator, which is well known in the art, amplifies the scale beam movement (which has about a one inch travel) about ten times, so that a much greater accuracy may be achieved. The pointer of the indicator opens and/or closes micro switches to control whatever electrical device is desired. The dash pot type indicator is shown in the drawings, though it will be understood that the invention is not limited to such an indicator, but may be applied to any of a number of indicators which are well known in the art.

It is therefore an object of the present invention to provide an automatic weighing device which will accurately control an electrical circuit.

It is another object of the present invention to provide a control means for an electrical circuit which may be readily and easily installed on a scale indicator and thereafter adjusted for accuracy.

Another object of the present invention is to provide in combination with a scale indicator a control means which will successively yet independently operate two or more circuits in response to the position of the scale indicator.

A further object of the present invention is to provide a simple control means which may be attached to any existing scale indicator.

And a further object of the present invention is to provide a control means which is simple and efficient in operation, and is well designed to meet the demands for economical manufacture.

Other and further objects, features and advantages of the present invention will become apparent from a consideration of the following specification taken in conjunction with the accompanying drawing in which:

FIG. 2 is a view similar to FIG. 1 having another form of the present invention incorporated therein.

FIG. 3 is an enlarged side elevational view of the control means shown in FIG. 1, and mounted in the scale indicator as shown in FIG. 1.

Figure 1:
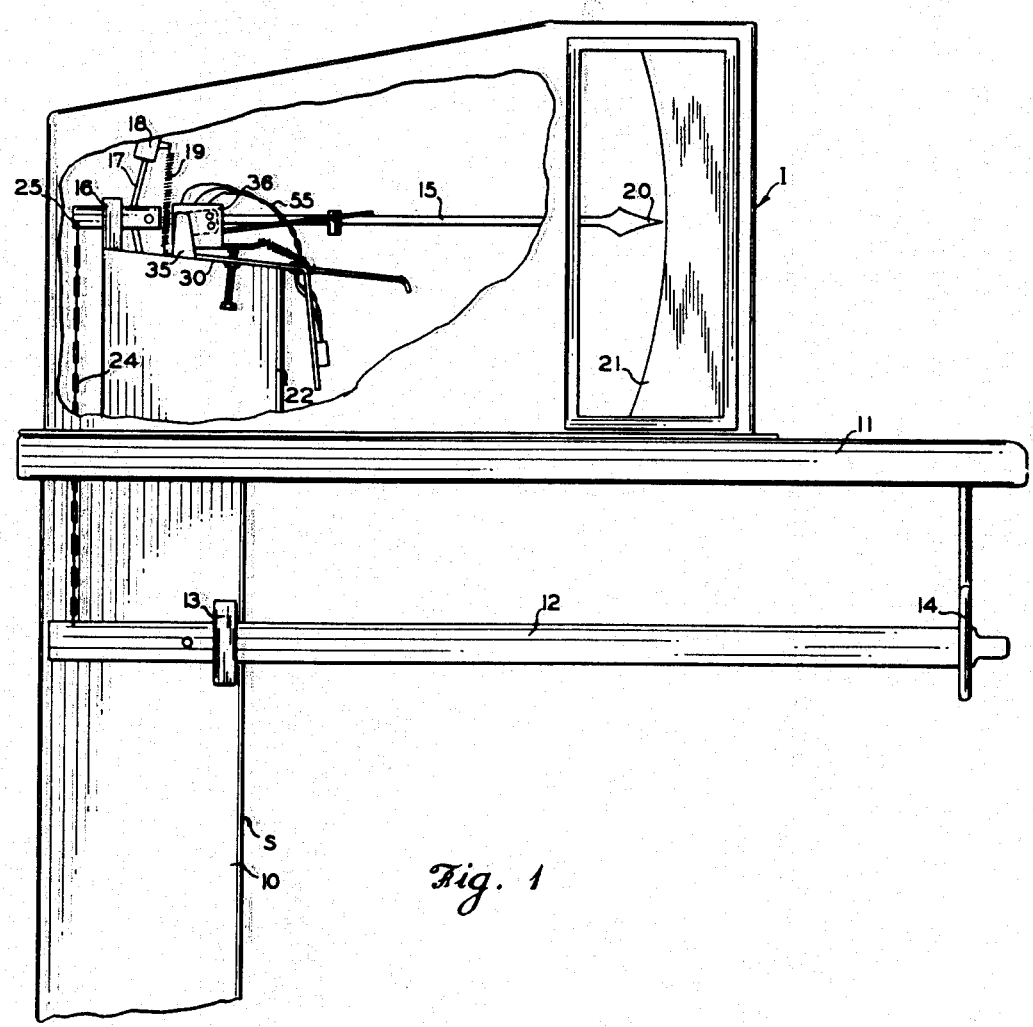
FIG. 1 is a front elevational view, partially broken away, of a conventional scale, and its scale indicator having one form of the present invention incorporated therein.

Referring now to FIG. 1 of the drawings, it will be seen that the scale S is of the conventional type having an upright support 10 with horizontal member 11. The scale beam 12 is pivoted at fulcrum member 13 and has its free end restricted by bracket 14. As is well known, in a scale S of this type, the scale beam 12 remains approximately horizontal on its fulcrum 13 in a slightly downwardly tilted position and rests on the lower limit established by bracket 14 when the weight on the scale S is insufficient to counterbalance the scale beam 12. As the weight placed on the scale approaches the predetermined amount, the scale beam 12 is shifted upwardly to a horizontal or essentially horizontal position in which the scale beam 12 is suspended between the limits established by bracket 14, thereby indicating a balanced condition. If weight in excess of the prescribed amount is placed on scale S, the scale beam 12 is overbalanced and is tilted slightly upwardly to engage the upper limit established by bracket 14.

Mounted on horizontal member 11 is the scale indicator I which is of the dash pot type. The indicator comprises a pointer 15 pivoted by bracket 16, and provided with an arm 17. On one end of arm 17 is a paddle (not shown), and on the other end is a counterweight 18. Spring 19 urges the pointer 15 and arm 17 in a clockwise direction, which tends to keep the pointer tip 20 at the bottom of the scale 21. A dash pot 22 exerts a restricting action on the movement of pointer 15.

A chain 24 is connected to scale beam 12 on the left of pivot point 13, and has its upper end connected at numeral 25 to the pointer 15; thus, as the scale beam 12 goes up, the chain 24 is pulled down, which causes the pointer 15 to move up proportionately to the movement of the scale beam 12.

The scale arrangement set forth in Hapgood, United States Patent No. 1,640,073, granted August 23, 1927, is illustrative of the general scale arrangement described above. Thus, the foregoing is well known in the art and a more detailed description is therefore considered unnecessary.

Referring now to the modified form of the present invention shown in FIG. 2, the scale S' is substantially identical to the scale S, and has the indicator I' mounted on the horizontal member 11'. The principal distinction is that the chain 24' is connected to the right side of the pivot 13', and has its other end connected to the right hand side of the pivot of pointer 15'. Thus, as the scale beam 12' moves upward, the pointer 15' will also move upward proportionately. This is well known in the art; therefore, the foregoing is deemed sufficient.

Figure 4:
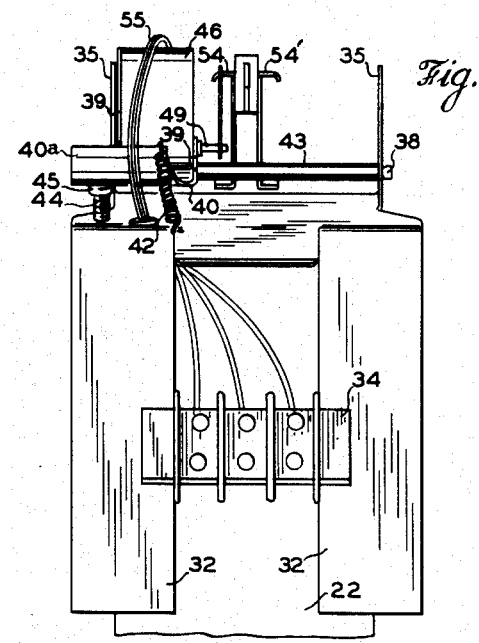
FIG. 4 is a front elevational view of the device shown in FIG. 3.

Referring to FIGS. 3 and 4 of the drawings, it will be seen that the control means or switch assembly of the present invention comprises a base plate 30 removably mounted on dash pot 22 by screws or the like. The forward portion of the plate 30 is formed into a pair of downwardly projecting bifurcated strips 32 which support a terminal block 34 therebetween. The rearmost end of plate 30 has a pair of upstanding ears 35 which carries therebetween a horizontally disposed pintle 38. A U-shaped switch carriage 36 is pivotally mounted on pintle 38, the spaced side plates 39 and 39' of carriage 36 journalling pintle 38. The platform 40 of carriage 36 connects the lower ends of walls 39, 39' and extends forwardly as at 40a. The forwardmost end of platform 40a is turned up and is provided with a hole which receives one end of spring 42, the other end of which fastens to the base plate 30 to urge the carriage in a clockwise direction, pivoting about pintle 38. The axial movement of carriage 36, with respect to pintle 38, is restricted by a sleeve 43 on pintle 38 between ears 35, the carriage being positioned adjacent one of ears 35.

To restrict selectively the clockwise rotation of carriage 36, there is an adjusting or set screw 44 threadedly projects through the base plate 30, the screw 44 having a head portion 45 bearing against the bottom of platform 40a. It will therefore be seen that upon rotation in the one direction, the adjusting screw 44 will raise the platform 40a and thereby rotate the entire switch carriage 36 upwardly about pintle 38 against the tension of spring 42. Upon rotation in the opposite direction, the screw 44 is lowered and spring 42 rotates the carriage 36 downwardly.

Between walls 39, 39' is mounted a small switch 46, such as a "micro switch," fixed to wall 39 by screws 47. The switch actuator 49 projects from one side of switch 46, and carries an outwardly projecting thin, flexible tubular metal wand 50.

Secured to pointer 15 is a clamp 52 having laterally projecting arms 54, 54'. The wand 50 projects beneath the arm 54. Since the wand 50 is urged upwardly by an internal spring (not shown) within switch 46, the wand 50 will remain under the arm 54 and follow the movement of the pointer 15.

From the foregoing it will be seen that the switch assembly described may be used in conjunction with a variety of scale indicators. The base plate 30 may be mounted in any convenient location so as to be adjacent the pointer, such as pointer 15. Wires 55 lead from switch 46 to terminal block 34. The terminal block 34 provides a convenient means for connecting a source of current B and a load R to the switch.

In operation, the assembly should be installed adjacent the pointer 15, and clamp 52 installed on pointer 15, with wand 50 projecting under arm 54. Since the pointer is urged downwardly by spring 19, and the wand 50 is urged upwardly by an internal spring (not shown), there is no danger of the wand slipping from under the arm 54.

The adjusting screw 44 may be set to vary the angular disposition of the switch carriage 36 and hence switch 46. By this means, the switch 46 is tilted to such a selected position that the wand 50 will actuate switch 46 at any preselected position of the pointer 15, and this preselected position may be readily varied by screw 44 within substantially the entire throw of the pointer 15.

With this arrangement, the switch 46 may be opened (or closed) with any desired weight on the scale S. Allowance may therefore be made for material in suspension from the feed means, thus providing accurate weighing. The switch may be of the single pole—double throw type here illustrated, in which case the switch may stop the feed mechanism and simultaneously turn on a warning light and perform like jobs. The switch shown requires an operating force of only one gram at one inch; therefore, the change required to re-balance the scale is very slight.

Figure 7:
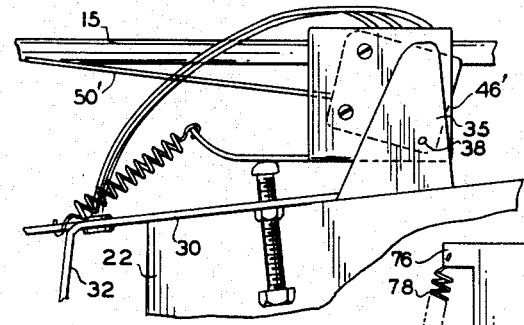
FIG. 7 is a fragmentary side elevational view of a modified form of the present invention.

It is also contemplated that, as seen in FIG. 7, an additional switch carriage having switch 46' may be mounted on the pintle 38 on the opposite side of the pointer 15, with the wand 50' under the arm 54'. The two switches 46, 46' may be adjusted to open (or close) at different times to lend greater versatility to the control means.

The above described assembly has assumed that the butt end of the scale beam is to be connected to the butt end of the pointer 15. In some indicators, the other end of the scale beam is to be connected to the pointer. For use in such cases, a modified form of the present invention is presented in FIGS. 2, 5 and 6.

Figure 5:
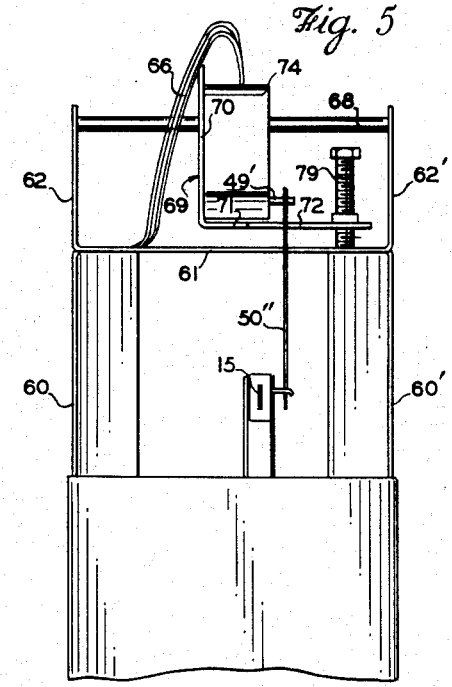
FIG. 5 is a front elevational view similar to FIG. 3, but showing that form of the invention illustrated in FIG. 2.
Figure 6:
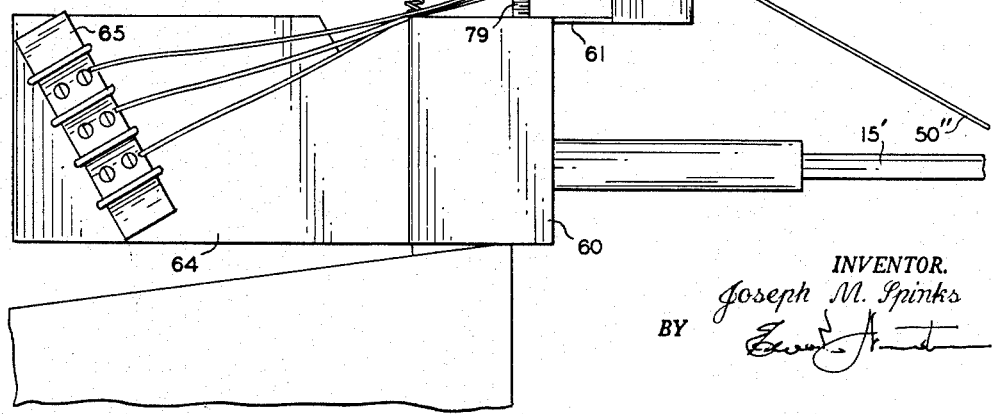
FIG. 6 is a side elevational view of the device shown in FIG. 5.

Referring primarily to FIGS. 5 and 6, it will be seen that the embodiment here depicted comprises a pair of opposed walls 60 and 60' jointed at the upper portion by platform 61. The platform 61 extends forwardly past walls 60, 60' and has upstanding ears 62, 62'.

Extending rearwardly from wall 60 is a plate 64 to which is secured a terminal block 65 having wires 66 leading to the switch.

A pintle 68 is secured between upstanding ears 62, 62', and carries a switch carriage 69. The carriage 69 comprises a side plate 70 through which pintle 68 passes to support the carriage, and a bottom plate 71. The bottom plate 71 has an extension 72 at the rear thereof, which acts as an adjusting arm. Secured to the side wall 70 is a switch 74, attached by any conventional means such as screws 75.

To provide angular adjustment of the switch carriage 69 and hence switch 74, the side plate 70 is provided with a protrusion 76 to which is connected one end of a spring 78. The other end of spring 78 is anchored to the platform 61, thus urging the switch carriage 69 in a counterclockwise direction, as viewed in FIG. 6. Projecting through and threadedly engaged with extension 72 of plate 71 is an adjusting screw 79 which bears against the platform 61; therefore, it will be seen that the screw 79 may cause a clockwise rotation of the switch carriage 69, as viewed in FIG. 6.

The switch 74 is provided with the switch actuator 49' and wand 50'' as previously described.

Thus, it will be seen that the present embodiment of the invention provides an assembly useful in indicators which will not allow projections toward the front. The angular disposition of the switch is adjustable through the cooperation of spring 78 and adjusting screw 79. The terminal block 65 facilitates easy connection of circuits to the switch 74 without interfering with either the switch assembly or the scale indicator mechanism. Though only one switch is here shown, it will be readily understood that a plurality of switches may be incorporated if desired.

It will therefore be seen that the present invention provides an efficient, economical and accurate means to control various signals and/or feed mechanisms through the use of a scale indicator. The adjustment is such that very accurate weighings may be accomplished; e.g., one such scale has been arranged to weigh within .01 pound. The forces added by the present arrangement are consistent, and so slight that re-balancing of the scale is very simple.

Therefore, it will be understood that the present invention is not limited to the particular embodiments here chosen by way of illustration, but many changes and modifications may be made, and the full use of equivalents resorted to without departing from the spirit or scope of the invention as outlined in the appended claims.

I claim:

1. The combination of a switch and scale in which the switch includes an outwardly extending switch operating wand and the scale includes a beam and a pointer connected with the beam for movement therewith in proportional response to weight on said scale, said wand being movably connected with said pointer, whereby motion of said pointer operates said switch, and a rotatably adjustable switch carriage mounted on said scale and supporting said switch for rotatable adjustment therewith, the arrangement being such that the movement of said pointer required to operate said switch is varied by rotatable adjustment of said switch and switch carriage with respect to the scale and pointer.

2. The combination of a switch and scale in which the switch includes an outwardly extending switch operating wand and the scale includes a beam and a pointer connected with the beam for movement in proportional response to weight on said scale, said combination including variably adjustable means for interconnecting said pointer and wand so that motion of said pointer operates said switch, and a rotatably adjustable switch carriage mounted on said scale and supporting said switch for rotatable adjustment therewith, the arrangement being such that the movement of said pointer required to operate said switch is varied by rotatable adjustment of said switch and switch carriage and by variable adjustment of the means for interconnecting said pointer and wand.

3. The combination as set forth in claim 2 in which the means for interconnecting said pointer and wand comprises an arm laterally projecting from said pointer and against which the wand is resiliently urged.

4. The combination of a switch and scale in which the switch incudes an outwardly extending switch operating wand and the scale includes a beam and a pointer connected with the beam for movement in proportional to weight on said scale, said combination including adjustable means for interconnecting said pointer and wand so that motion of said pointer operates said switch, a rotatably adjustable carriage mounted on said scale and supporting said switch for rotatable adjustment therewith, means extending between said scale and switch carriage for urging said switch carriage in one direction of rotatable adjustment, and adjustable means extending between said scale and said switch carriage for limiting the movement of said switch carriage in response to said means for urging said switch carriage in said one direction of rotatable adjustment.

5. The combination with a scale and a pair of switches in which the scale includes a beam and a pointer connected with the beam for movement in proportional response to weight on the scale and in which each of the pair of switches includes an outwardly extending switch operating wand, said combination including means for interconnecting the wand of each switch to said pointer so the motion of pointer operates said switches, a rotatably adjustable switch carriage for each switch mounted on said scale and supporting a switch for rotational adjustment relative to said scale, a spring means on each switch carriage for urging each carriage in one direction, and an adjusting means on each carriage for opposing the urging of the spring means.

References Cited by the Examiner
UNITED STATES PATENTS

| | | | |
|---|---|---|---|
| 1,117,335 | 11/14 | Coplon | 200—56 |
| 1,640,073 | 8/27 | Hapgood | 177—17 |
| 1,978,215 | 10/34 | McCrery | 200—85 |
| 2,167,517 | 7/39 | Korber | 200—56 |
| 2,543,680 | 2/51 | Veevers et al. | 200—56 |
| 2,620,412 | 12/52 | Ford | 200—56 |
| 2,746,708 | 5/56 | Gilchrist | 177—79 |
| 2,803,718 | 8/57 | Bloom et al. | 200—166 |

BERNARD A. GILHEANY, *Primary Examiner.*

MAX L. LEVY, ROBERT K. SCHAEFER,
*Examiners.*